(12) United States Patent
Nadehara

(10) Patent No.: US 7,484,682 B1
(45) Date of Patent: Feb. 3, 2009

(54) OPERATING A TAPE DRIVE DURING AND AFTER A TRANSITION TO A STAND-BY MODE

(75) Inventor: Shuhei Nadehara, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/125,294

(22) Filed: May 22, 2008

(51) Int. Cl.
*G11B 15/18* (2006.01)

(52) U.S. Cl. .............. 242/333.6; 242/334.6; 242/413.3; 242/420.6; 360/74.2

(58) Field of Classification Search ............... 242/333, 242/333.4, 333.6, 333.7, 334, 334.2, 334.3, 242/334.4, 334.6, 353, 413, 413.1, 413.3, 242/413.4, 413.5, 420, 420.5, 420.6; 360/69, 360/70, 71, 72.3, 74.1, 74.2, 96.1, 96.3, 137; 318/6, 7, 34, 69
See application file for complete search history.

(56) References Cited

U.S. PATENT DOCUMENTS

| | | | | |
|---|---|---|---|---|
| 4,217,615 A | | 8/1980 | Suzuki | |
| 4,385,330 A | * | 5/1983 | Serafini | 360/74.2 |
| 4,597,547 A | * | 7/1986 | Tarpley et al. | 242/333.7 |
| 4,632,333 A | * | 12/1986 | Tarpley, Jr. | 242/334.4 |
| 4,664,336 A | * | 5/1987 | Koyama | 242/334.3 |
| 4,801,853 A | * | 1/1989 | Lewis et al. | 318/7 |
| 5,356,088 A | * | 10/1994 | Fujisawa et al. | 242/334.4 |
| 5,410,224 A | | 4/1995 | Fujisawa | |
| 5,474,245 A | * | 12/1995 | Gunday et al. | 242/334.6 |
| 5,701,214 A | | 12/1997 | Inoue et al. | |
| 5,801,893 A | * | 9/1998 | Miller et al. | 360/74.2 |
| 6,057,973 A | * | 5/2000 | Bar | 360/72.3 |
| 6,257,515 B1 | * | 7/2001 | Fukuda et al. | 242/333.7 |
| 6,597,535 B1 | | 7/2003 | Marzluf | |
| 6,934,109 B2 | * | 8/2005 | Bui et al. | 360/72.3 |
| 2003/0016465 A1 | * | 1/2003 | Bui et al. | 360/72.3 |

FOREIGN PATENT DOCUMENTS

| | | |
|---|---|---|
| JP | 10312599 | 11/1998 |
| JP | 2003208741 | 7/2003 |

\* cited by examiner

*Primary Examiner*—William A Rivera
(74) *Attorney, Agent, or Firm*—James R. Nock; Dillon & Yudell LLP

(57) ABSTRACT

In a tape drive during a transition to a stand-by mode, a tape is wound under control of a processor (e.g., CPU) until duration of a time interval between moments when rotational positions of the reels change decreases to a pre-determined threshold. Thereafter, in the stand-by mode, the processor switches control over the tape drive to a low-power logic circuit (e.g., PLC) and enters a power-save mode.

1 Claim, 3 Drawing Sheets

OPERATING A TAPE DRIVE DURING AND AFTER A TRANSITION TO A STAND-BY MODE

BACKGROUND OF THE INVENTION

1. Technical Field

The present invention generally relates to tape drives and, in particular, to techniques for operating a tape drive during and after a transition from an operational mode thereof to a stand-by mode.

2. Description of the Related Art

Occasionally, tape drives (for example, back-up tape drives of computerized systems or devices) remain in a stand-by mode between read and write cycles for extended periods of time. During such periods of time, a tape in the tape drive tends to sag and may be damaged after the tape drive returns back to an operational mode. Furthermore, while in the stand-by mode motors of a tape-pulling mechanism are disabled or sparsely used, a processing system of the tape drive remains operational and continues to require/consume amounts of power that may be of a concern in power-limited applications.

SUMMARY OF ILLUSTRATIVE EMBODIMENTS

A method, apparatus, and computer program product for operating a tape during and after a transition from an operational mode to a stand-by mode are disclosed. In one embodiment, during the transition, a tape is wound on a first reel of the tape drive from a second reel thereof under control of a processor (e.g., CPU) until duration of a time interval between moments when rotational positions of the reels change becomes equal to or smaller than a pre-determiined threshold. Then, the processor switches control over the tape drive to a low-power logic circuit (e.g., PLC) and enters a power save mode. In the stand-by mode, the logic circuit detects when a rotational position of the first or second reel changes and counter-rotates the respective reel until the rotational position thereof is restored.

All objects, features and advantages of the present invention will become apparent in the following detailed written description.

BRIEF DESCRIPTION OF TILE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

Figure 1:
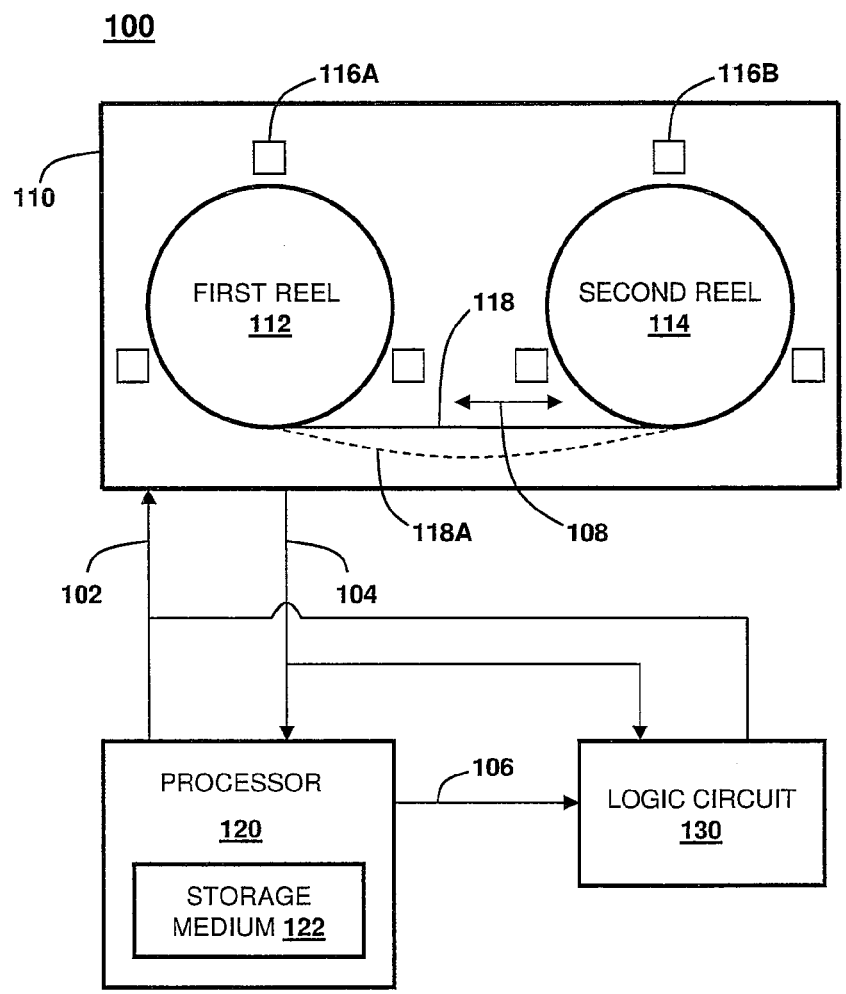
FIG. 1 is a high level block diagram of a tape drive configured for implementing one or more embodiments of the invention.

The images in the drawings are simplified for illustrative purposes and are not depicted to scale. To facilitate understanding, identical reference numerals are used, where possible, to designate substantially identical elements that are common to the figures, except that suffixes may be added, when appropriate, to differentiate such elements.

It has been contemplated that features or steps of one embodiment may be incorporated in other embodiments of the invention without further recitation.

DETAILED DESCRIPTION OF AN ILLUSTRATIVE EMBODIMENT

The present invention provides a method, system, and computer program product for operating a tape drive during and after a transition from an operational mode thereof to a stand-by mode.

With reference now to the figures, and in particular with reference to FIG. 1, there is illustrated a high level block diagram of an illustrative embodiment of tape drive 100 in accordance with the present invention. In particular, tape drive 100 includes tape transport 110, processor (e.g., computer processing unit (CPU)) 120 having storage medium 122, and low-power logic circuit (e.g., low-power programmable logic controller (PLC)) 130.

In one embodiment, tape transport 110 generally comprises motorized first and second tape reels 112 and 114 and a plurality of sensors 116, which monitor rotational positions of the reels. In operation, tape transport 110 winds/rewinds tape 118 to/from reels 112, 114 using one or more motors (not shown) that are kinematically coupled to the reels. The motors and sensors 116 are connected to processor 120 and logic circuit 130 via control interface 102 (motors) and data interface 104 (sensors).

In the depicted embodiment, rotational positions of reels 112 and 114 are illustratively monitored using three sensors 116A and 116B, respectively. However, in alternate embodiments, the number of such sensors may be either greater or smaller than three. In one exemplary embodiment, sensors 116 are individually addressable Hall effect sensors having processor-compatible digital inputs and outputs.

In operation, processor 120 executes program code stored in storage medium 122. In the depicted embodiment, storage medium 122 is a portion of processor 120, however, in other embodiments storage medium 122 may be an external device communicatively coupled to processor 120. In one embodiment, via command interface 106, processor 120 disables logic circuit 130 during the operational mode of the tape drive 100 and during a transition from the operational mode to a stand-by mode of the tape drive 100, and enables the logic circuit during the stand-by mode.

In the operational mode, tape 118 is wound and/or maintained, under control of processor 120, at pre-determined tension, which is applied by reels 112 and 114 in the directions of arrow 108. However, in the stand-by mode of tape drive 100, control of the tension is terminated, and tape 118 may tend to sag (shown with dotted line 118A).

Figure 2:
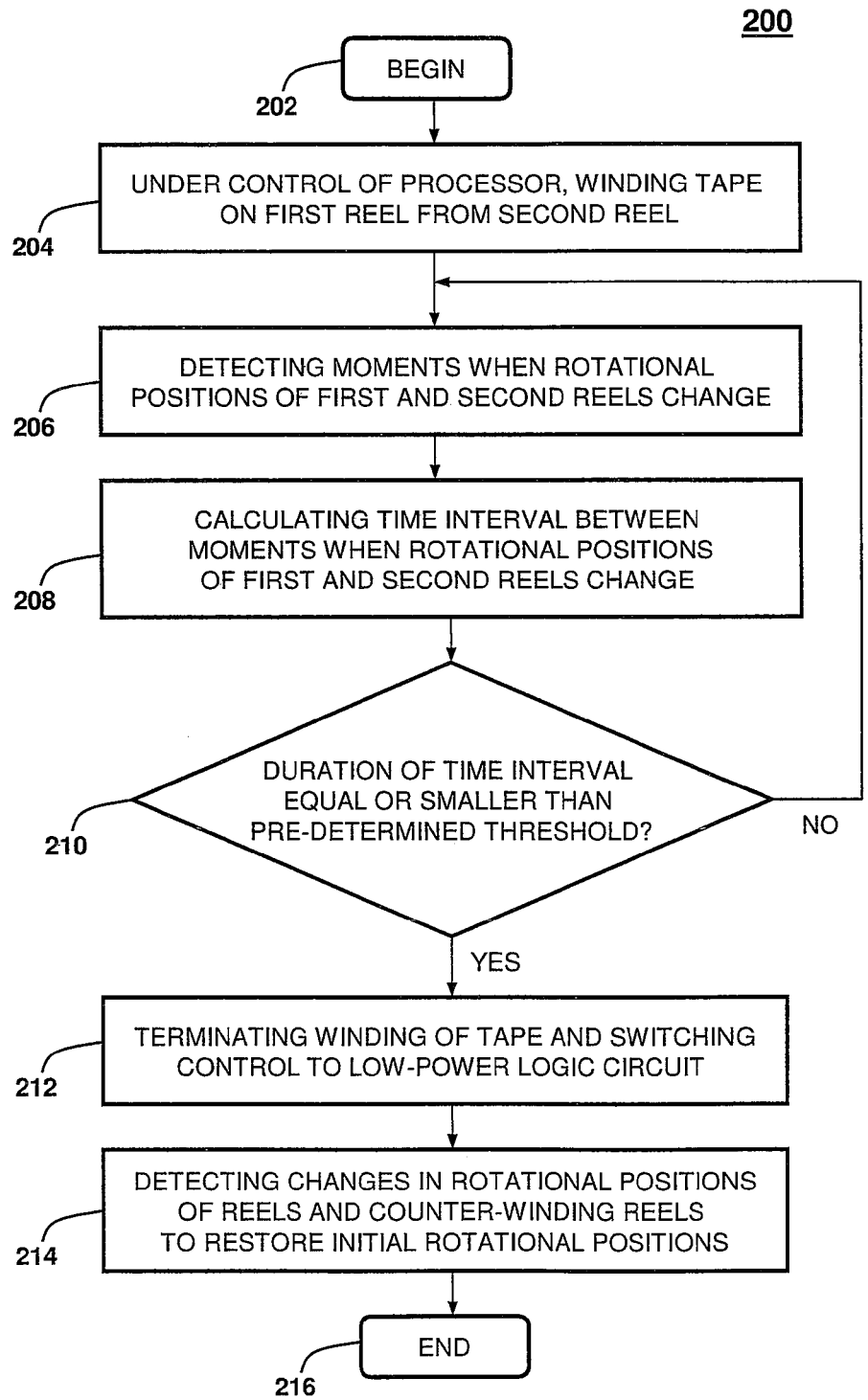
FIG. 2 is a high level flowchart of a process by which the features of the invention are implemented, according to one embodiment of the invention.

With reference now to FIG. 2, there is illustrated a high level logical flowchart of process 200 for operating tape drive 100 during and after a transition from an operational mode thereof to a stand-by mode in accordance with one embodiment of the present invention. To best understand the invention, the reader should refer to FIGS. 1-3 concurrently.

As shown, process 200 begins at block 202 and thereafter proceeds to block 204. At block 204, in the operational mode of tape drive 100, tape 118 is wound onto one of reels 112, 114 under the control of processor 120. Arbitrarily, tape 118 is wound onto reel 112 from reel 114, i.e., in the direction of arrows 306 and 308, respectively. Preferably, however, not necessarily, tape 118 is wound onto reel 112 at one of the lower rotational speeds of tape transport 110, for example, at a lower speed then used during read or write access to tape 118.

Figure 3:
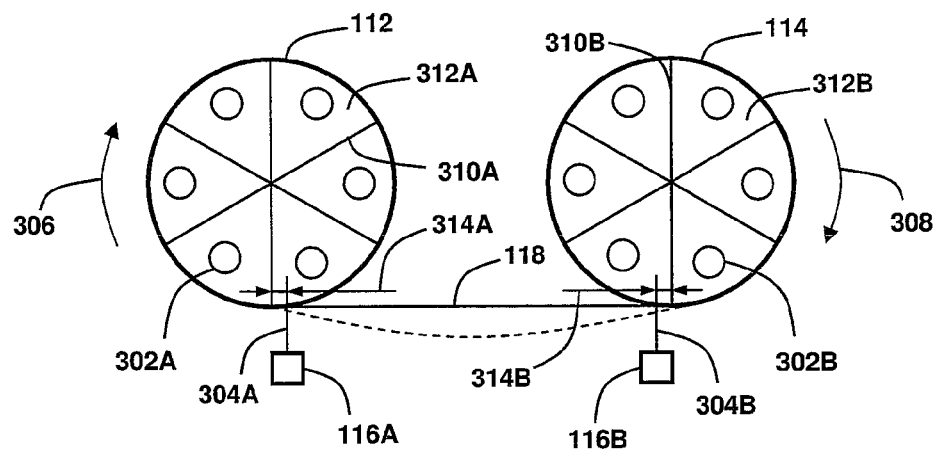
FIG. 3 is a schematic diagram illustrating a transition of the tape drive of FIG. 1 to a stand-by mode.

Referring to FIG. 3, arbitrarily, a state of sensor 116A (or 116B) changes when boundary 310A between adjacent regions 312A (or 312B) passes detection line 304A (or 304B) of the sensor (for clarity, one sensor 116A and one sensor 116B are shown). Boundaries 310 of regions 312 are defined by markers 302, which are disposed therein and sensed by sensors 116. Such markers 302 may be associated with either reels 112 and 114 (as shown) or components of a motorized drive thereof. For example, rotating magnets or coils of brushless DC motors may be used as markers 302 for Hall effect sensors 116.

At block 206, via sensor interface 104, processor 120 detects the moments when rotational positions of reels 112, 114 change as indicated by the states of their sensors 116A (reel 112) and 116B (reel 114) switching. For example, a state of sensor 116 may switch from one logic level to the other logic level (i.e., from logic "1" to logic "0" or logic "0" to logic "1"). Then, at block 208, processor 120 calculates the durations of time intervals between adjacent events of state changes among sensors 116A and 116B.

Figure 4:
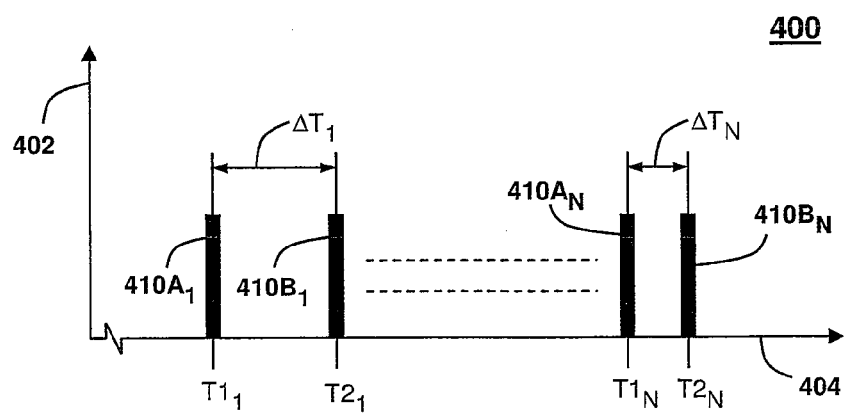
FIG. 4 is a timing diagram illustrating the transition of the tape drive of FIG. 1 to the stand-by mode.

Referring additionally to FIG. 4, graph 400 depicts events 410 of state change in sensors 116 (y-axis 402) versus time (x-axis 404). Illustratively, the timing of events 410 coincides with the moments when boundaries 310 pass detection lines 304 of sensors 116. In particular, at moments T1 and T2, processor 120 detects and records consecutive occurrences of state changes in some sensors 116A and 116B, respectively. Thereafter, changes in states of other sensors 116A and 116B are similarly detected and recorded by processor 120 (N pairs of consecutive events $410A_1 - 410A_N$, and $410B_1 - 410B_N$ are shown). As reels 112 and 114 continue rotating in the same direction (i.e., in the direction of arrows 306 and 308), initial sagging of tape 118 is gradually being removed, which results in shortening of time interval $\Delta T$ between adjacent events 410A, 410B.

At block 210, processor queries whether or not duration of the time interval between the adjacent events of the state change among sensors 116A and 116B is equal to or smaller than pre-determined threshold $T_0$ (i.e., whether or not $\Delta T \leq T_0$). If the query is answered negatively, process 200 proceeds back to block 206, which has been described. If, however, the query is answered positively, at block 212, processor 120 terminates winding tape 118 and transfers control over tape drive 100 to low-power logic circuit 130 for duration of the stand-by mode of tape drive 100. In one embodiment, thereafter processor 120 enters a power save mode.

Referring back to FIG. 3, when the condition of the query of block 210 is met (i.e., $\Delta T \leq T_0$), rotation of reels 112, 114 terminates with detection lines 304A, 304B of sensors 116A, 116B disposed in close proximity (illustratively shown as distances 314A, 314B) to boundaries 310A, 310B. Therefore, in the stand-by mode of tape drive 110, small values of sagging of tape 118 may be promptly detected by sensors 116A, 116B.

At block 214, during the stand-by mode of tape drive 100, logic circuit 130 monitors sensors 116 to detect changes, if any, in rotational positions of reels 112 and/or 114 and, when such a change is detected, counter-winds the respective reel to restore initial rotational position thereof. In one embodiment, block 214 performs techniques described in Japanese Patent Application No. 09-121060, filed on Dec. 5, 1997. Process 200 thereafter terminates at block 216, for example, in response to processor 120 communicating a disable command or signal via command interface 106.

While the invention has been particularly shown as described with reference to a preferred embodiment, it will be understood by those skilled in the art that various changes in form and detail may be made therein without departing from the spirit and scope of the invention. For example, it will be appreciated that the concepts disclosed herein may be extended or modified to apply to other types of configuration entities than those disclosed herein. In addition, those skilled in the understand upon reference to the foregoing that any of a wide variety of rules may be applied to determine which configuration entities are presented, meaning that the particular syntax and presentation rules described herein are merely exemplary and not exhaustive.

Furthermore, although aspects of the present invention have been described with respect to a computer system executing software that directs the functions of the present invention, it should be understood that present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette, flash memory, or hard disk drive). It should be understood, therefore, that such signal-bearing media, when carrying or encoding computer readable instructions that direct the functions of the present invention, represent alternative embodiments of the present invention.

What is claimed is:

1. The method of operating a tape drive having a first reel, a second reel and a tape wound on said reels, the method comprising:
    performing under control of a processor during a transition from an operational mode to a stand-by mode:
        winding the tape onto the first reel from the second reel;
        monitoring rotational positions of the first and second reels; and
        when duration of a time interval between changes in the rotational positions of said first and second reels becomes equal to or smaller than a pre-determined threshold, (i) terminating winding the tape, (ii) entering the stand-by mode, and (iii) switching control over the tape drive to a logic circuit; and
    performing under control of the logic circuit during the stand-by mode:
        detecting a change in a rotational position of at least one of the first or second reels from a first position to a second position; and
        counter-rotating said at least one of the first or second reels until the rotational position thereof is restored from the second position to the first position.

* * * * *